(12) United States Patent
Ratajczack et al.

(10) Patent No.: US 10,519,826 B2
(45) Date of Patent: Dec. 31, 2019

(54) OIL MIST SEPARATOR AND DEVICE FOR A CRANKCASE VENTILATION

(71) Applicant: MANN+HUMMEL GMBH, Ludwigsburg (DE)

(72) Inventors: Christelle Ratajczack, Forcé (FR); Thierry Marimbordes, Laval (FR); Thomas Schleiden, Oberstenfeld (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 284 days.

(21) Appl. No.: 15/396,348

(22) Filed: Dec. 30, 2016

(65) Prior Publication Data

US 2017/0145879 A1 May 25, 2017

Related U.S. Application Data

(63) Continuation of application No. PCT/EP2015/064021, filed on Jun. 23, 2015.

(30) Foreign Application Priority Data

Jun. 30, 2014 (EP) ..................... 14290192

(51) Int. Cl.
*B01D 39/00* (2006.01)
*F01M 13/04* (2006.01)
(Continued)

(52) U.S. Cl.
CPC ............. *F01M 13/04* (2013.01); *B01D 45/08* (2013.01); *F01M 13/00* (2013.01);
(Continued)

(58) Field of Classification Search
CPC ........... F01M 13/04; F01M 2013/0433; F01M 13/00; F01M 13/0011; F01M 13/022; F01M 13/0416; B01D 45/08
See application file for complete search history.

(56) References Cited

U.S. PATENT DOCUMENTS 9,149,752 B2 * 10/2015 Schleiden .............. B01D 45/08
2004/0232052 A1 * 11/2004 Call .................... B01D 21/2455
209/143

(Continued)

*Primary Examiner* — Dung H Bui
(74) *Attorney, Agent, or Firm* — James Hasselbeck

(57) ABSTRACT

An oil mist separator (10) for a crankcase ventilation (11) such as in an internal combustion engine (13) for separating oil particles from a gaseous fluid, in particular blow-by gas is disclosed. The oil mist separator (10) has at least one nozzle plate (24). The at least one nozzle plate (24) is arranged in a flow way of the gaseous fluid. The nozzle plate (24) has at least one aperture (26; 126) for the gaseous fluid. The oil mist separator (10) further has at least one impact surface (32; 132). The at least one impact surface (32; 132) is arranged downstream of the nozzle plate (24) relating to the flow of the gaseous fluid. The at least one impact surface (32; 132) can be moved away from the at least one nozzle plate (24) in an opening direction (36) against a pretension force by influence and dependent on a flow of the gaseous fluid through the at least one aperture (26; 126). At least one aperture is formed as a nozzle aperture (26) and at least one control protrusion (42; 142) for controlling the flow cross-section of at least one aperture (26; 126) is attached to at least one impact surface (32).

14 Claims, 5 Drawing Sheets

(51) Int. Cl.
  *B01D 45/08* (2006.01)
  *F01M 13/00* (2006.01)
  *F01M 13/02* (2006.01)

(52) U.S. Cl.
  CPC ....... *F01M 13/0011* (2013.01); *F01M 13/022* (2013.01); *F01M 13/0416* (2013.01); *F01M 2013/0433* (2013.01)

(56) References Cited

U.S. PATENT DOCUMENTS

| | | |
|---|---|---|
| 2006/0059875 A1 | 3/2006 | Malgorn |
| 2009/0199826 A1 | 8/2009 | Meinig |
| 2010/0142544 A1 | 6/2010 | Chapel et al. |
| 2011/0023429 A1* | 2/2011 | Janakiraman .......... B01D 45/08 55/434 |
| 2012/0192536 A1* | 8/2012 | Severance .............. B01D 45/08 55/418 |
| 2014/0157737 A1 | 6/2014 | Schleiden |
| 2015/0275720 A1 | 10/2015 | Ruppel |

* cited by examiner

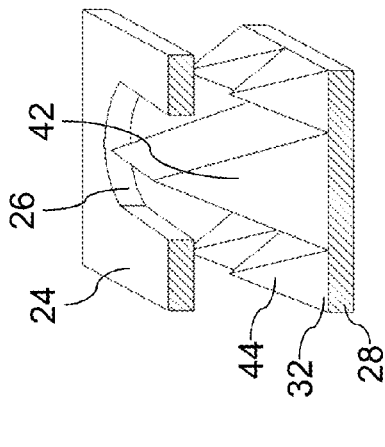
Fig. 8
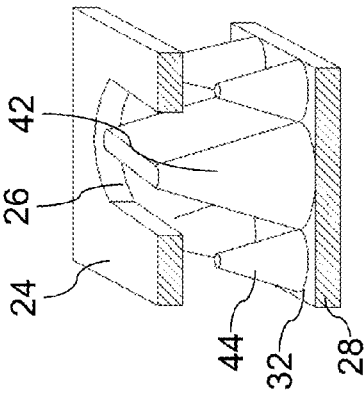
Fig. 9
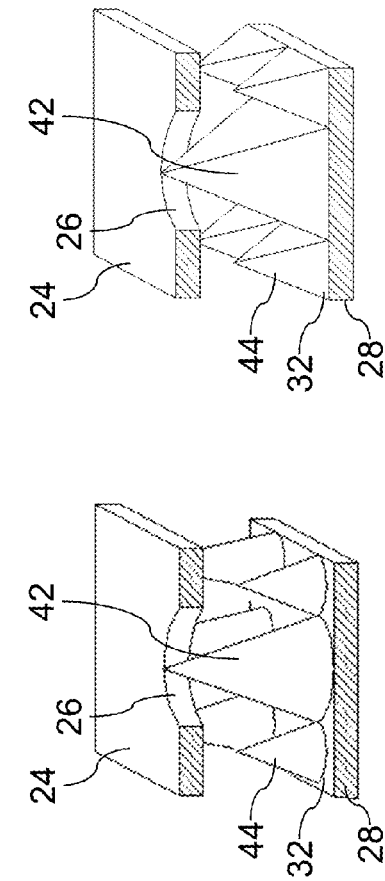
Fig. 6
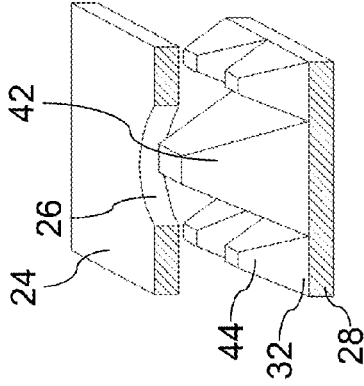
Fig. 7
Fig. 4
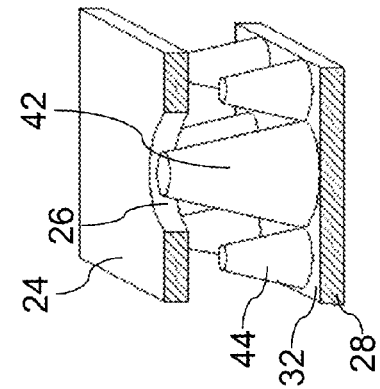
Fig. 5

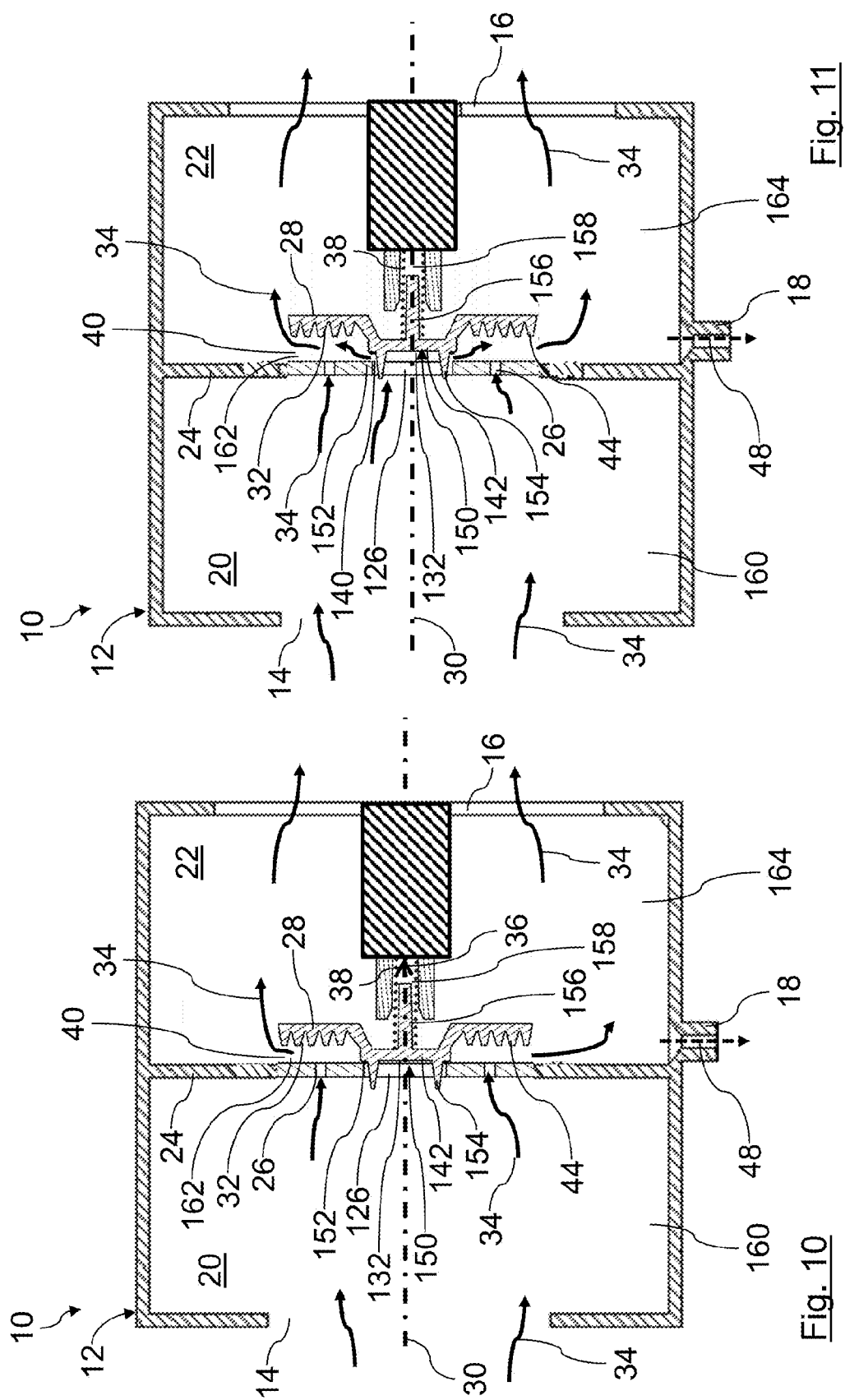

OIL MIST SEPARATOR AND DEVICE FOR A CRANKCASE VENTILATION

TECHNICAL FIELD

The present invention relates to an oil mist separator, in particular of a device for a crankcase ventilation, in particular of an internal combustion engine, in particular of a motor vehicle, for separating oil particles from a gaseous fluid, in particular blow-by gas, having at least one nozzle plate, which is arranged in a flow way of the gaseous fluid and which has at least one aperture for the gaseous fluid, having at least one impact surface, which is arranged downstream of the nozzle plate relating to the flow of the gaseous fluid and which can be moved away from the at least one nozzle plate in an opening direction against a pretension force by influence and dependent on a flow of the gaseous fluid through at least one aperture.

Further the present invitation relates to a device for a crankcase ventilation, in particular of an internal combustion engine, in particular for a motor vehicle, comprising at least one oil mist separator for separating oil particles from a gaseous fluid, in particular blow-by gas.

BACKGROUND

The EP 2 087 213 B1 discloses a device for eliminating oil particles from the crankcase ventilation gas in an internal combustion engine. The device is located in a flow duct of the crankcase ventilation gas that runs from the crankcase to an induction tract of the internal combustion engine. The device comprises an oil separator in the form of an outlet for the crankcase ventilation gas with a deflection of the flow, causing the oil particles to be deposited on a baffle surface and thus be eliminated from the crankcase ventilation gas flow. An infeed cross-section, which lies upstream of the baffle surface when viewed from the flow direction of the crankcase ventilation gas, is sub-divided into several infeed sub-sections. The baffle surface is a solid surface that is devoid of perforations. Said baffle surface is configured on a valve body, which lies downstream of the infeed sub-sections when viewed in the flow direction of the crankcase ventilation gas. The valve body is pre-tensioned by a force in closing direction. The valve body can be displaced in the opening direction against the pre-tension force by the crankcase ventilation gas as a result of differential pressure between the crankcase and the induction tract.

SUMMARY

It is an object of the invention to provide an oil mist separator and a device for crankcase ventilation of the above-mentioned kind, where a relation between the efficiency of separation and the loss of pressure is improved. Particularly, the efficiency of separation can be improved and/or the loss of pressure can be reduced.

The object is achieved by the oil mist separator by that at least one aperture is formed as a nozzle aperture and at least one control protrusion for controlling a flow cross-section of at least one aperture is attached to at least one impact surface.

According to the invention, the at least one control protrusion can be moved automatically together with the at least one impact surface. The at least one control protrusion can be designed for affecting a shape and/or a size of the flow cross-section dependent on a position relative to the at least one aperture. Therefore, the at least one aperture can be closed or covered at least partially by the at least one control protrusion.

Advantageously, at least one control protrusion can act together with at least one nozzle aperture.

Alternatively or additionally, advantageously at least one control protrusion can act together with at least one aperture which is not formed as a nozzle aperture.

One result of the invention is to maintain a flow velocity of the gaseous fluid as constant as possible in particular while a flow rate varies. Another result is to increase a distance between at least one nozzle aperture and the impact surface as the flow rate increases. A further result of the invention can be to reduce a pressure loss between the upstream side and the downstream side of the nozzle plate.

In an initial state the distance between the at least one impact surface and the at least one nozzle plate, in particular the at least one aperture, can have its minimum. The minimum distance can be ensured by use of at least one distance element and/or by use of at least one control protrusion. The at least one distance element and/or the at least one control protrusion can be placed between the at least one nozzle plate and the at least one impact surface. At least one distance element can be attached either to the at least one nozzle plate or the at least one impact surface.

The pretension force can hold the at least one impact surface in the initial state. In the initial state, at least one control protrusion can be placed near, on or at least partly inside the at least one aperture. So, the at least one control protrusion can reduce the nominal gas flow through the at least one aperture.

The initial position can be realized during standard working conditions. In standard working conditions the flow rate of the gaseous fluid normally can be close to zero or relative low.

In operation state, the gaseous fluid through at least one aperture can stream against the at least one impact surface. By means of the at least one impact surface the oil particles being separated from the gaseous fluid.

With increasing flow rate, the stream of the gaseous fluid can cause an opening force which can be directed against the pretension force. As soon as the opening force exceeds the pretension force, the at least one impact surface can move. The at least one impact surface can be moved dependent on the gas flow through at least one aperture.

The higher the gas flow is, the more the at least one impact surface can be deflected from the initial position into a further operation position in a greater distance from the at least one nozzle plate.

Particularly, the pretension force can be predetermined for allowing a movement of the at least one impact surface as soon as a difference between a pressure upstream of the at least one impact surface or the at least one nozzle plate on one side and a pressure downstream of the at least one impact surface or the at least one nozzle plate on the other side exceeds a value which corresponds to the oil return working conditions.

By moving the at least one impact surface away from the at least one nozzle plate a flow cross-section of a flow path between the at least one nozzle plate and the at least one impact surface can be increased. As a result, a loss of pressure can be limited or reduced. So, the oil mist separator can function with relatively high flows of blow-by gas.

Further, the at least one control protrusion can be moved relative to the at least one aperture by moving the at least one impact surface. In this way, an opening through which the gaseous fluid can flow, in particular the flow cross-section, of the at least one aperture can be changed automatically. Particularly, the opening, in particular the flow cross-section, can be increased. As a result, the flow velocity through the at least one aperture can be influenced, in particular be reduced.

The flow cross-section of at least one aperture, reduced by the at least one control protrusion in the initial position can be equivalent to a hole with a diameter of a circular nozzle which leads to the same differential pressure.

A range of movement, an initial position flow cross-section and a final position flow cross-section are chosen, taking into account an engine displacement and an engine specific blow-by flow rate and contamination.

By moving the at least one impact surface, the diameter of the section of the at least one control protrusion placed in the area of the downstream edge of the at least one round aperture can decrease. The flow cross-section of the at least one aperture in the further operation state reduced by the at least one control protrusion can increase thanks to the motion of the impact surface.

Particularly, the flow velocity through at least one aperture can be maintained to a defined level. Preferably, the flow velocity can be kept steady. Instead of that or additionally an increase of the pressure loss can be kept small. Preferably, a pressure loss can be maintained. So, the flow velocity and/or the pressure loss can be kept more independent from the total gas flow rate of the gaseous fluid. Particularly, a flow velocity of the gaseous fluid can be kept steady for some total flow rates of the engine.

A nominal cross-section of at least one aperture can be changed depending on the flow rate of the gaseous fluid in order to limit the pressure loss at large flow rates. So the oil mist separator can be operated with a high efficiency of separation with a very large range of flow rates.

Particularly, at least one control protrusion can interact with at least one aperture for realizing and open-loop controlling and/or a closed-loop controlling of the velocity through at least one aperture.

Favorably, at least one control protrusion can be realized in one piece with the at least one impact surface. Alternatively, the at least one control protrusion can be attached to the at least one impact surface as a separate component.

Favorably, at least one control protrusion and/or at least one impact surface can be realized as part of a valve body, in particular a valve plate, or vice versa.

Particularly, the at least one nozzle plate can have more than one apertures. So, the total gas flow through the nozzle plate can be increased. The apertures can be identical or different. The apertures can be arranged uniform or non-uniform.

Favorably, each of the apertures or only some of the apertures can have a corresponding control protrusion.

Favorably, the at least one nozzle plate can have a number of apertures defined according to the blow-by range of the engine. In this way the efficiency of separation can be optimized.

Particularly, the at least one impact surface can have more than one control protrusions. The control protrusions can be identical or different. The control protrusions can be arranged uniform or non-uniform.

According to a favorable embodiment of the invention, at least one control protrusion can extend at least partly into and/or on and/or over at least one aperture at least in an initial state. In the case that the at least one control protrusion extends at least partly into the at least one aperture, a gap can be realized between the at least one control protrusion and the radial inner circumferential side of the at least one aperture. This gap can define the flow cross-section of the at least one aperture.

Preferably, the length of at least one control protrusion axial to a moving axis enables to keep the at least one control protrusion inside at least one aperture within a range of moving of the at least one impact surface. Preferably, the moving axis can be axial or parallel to a separate axis of the oil mist separator.

Alternatively or additionally, a size of the at least one control protrusion across the moving axis can be bigger than the width of the at least one aperture on this side. In this case, the at least one control protrusion can extend over at least one aperture. So, the at least one control protrusion can cover the at least one aperture. Favorably, the at least one control protrusion can seal the at least one aperture.

Favorably, a maximum distance between the at least one impact surface and the at least one nozzle plate can be greater than a length of at least one control protrusion axial to a moving axis. In this way, if so said at least one control protrusion can be completely pulled out of the at least one aperture. So, the maximum flow cross-section can be achieved by the free cross-section of the at least one aperture. Alternative, the maximum distance can be equal or less than the length of the at least one control protrusion.

According to a further favorable embodiment of the invention, at least one aperture and/or the radial outer circumferential side of at least one control protrusion can have a circular, an elliptical, an oval, a somehow angular or a suchlike other cross-section. Such cross-sections can easily be realized.

According to a further favorable embodiment of the invention, the shape of the cross-section of at least one aperture can be similar to the shape of the cross-section of the radial outer circumferential side of the at least one corresponding control protrusion. In this way, a gap between the at least one control protrusion, in particular the radial outer circumferential side of the at least one control protrusion, and the at least one aperture, in particular the radial inner circumferential side of the at least one aperture, can be equal in circumferential direction. Thus, the gaseous fluid can flow more homogeneous through the at least one aperture, in particular through the gap.

According to a further favorable embodiment of the invention, the shape of the cross-section of at least one aperture can be dissimilar to the shape of the cross-section of the radial outer circumferential side of the at least one corresponding control protrusion. In this way, the gap between the at least one control protrusion, in particular the radial outer circumferential side of the at least one control protrusion, and the at least one aperture, in particular the radial inner circumferential side of the at least one aperture, can vary in circumferential direction.

Particularly, at least one aperture can be circular and the cross-section of the at least one corresponding control protrusion can be oval, elliptical, angular or suchlike other than circular.

According to a further favorable embodiment of the invention, at least one control protrusion can have a variable radial outer circumferential side when viewed axial to the moving axis, in particular the circumference of the at least one control protrusion can decrease toward its free end, which is facing the nozzle plate. In this way, the gap between the radial outer circumferential side of the at least one control protrusion and the radial inner circumferential side of the at least one aperture can be enhanced automatically by the movement of the at least one impact surface away from the at least one nozzle plate.

In the initial position the part of the at least one control protrusion with its extended cross-section can cover the at least one aperture. So, the gap between the at least one control protrusion and the at least one aperture can be minimized. In a further operating state the cross-section of the at least one control protrusion which covers the at least one aperture can decrease. Accordingly, the flow cross-section can increase.

According to a further favorable embodiment of the invention, at least one control protrusion can have a shape similar to a pyramid, a cone, an obelisk, a wedge, a pin, a cylinder or a frustum of a pyramid/cone/obelisk/wedge or suchlike. In this way, a continuous opening characteristic can be achieved for the at least one aperture.

Advantageously, at least one control protrusion can be realized by a convexity of the at least one valve plate.

According to a further favorable embodiment of the invention, the at least one impact surface can be biased with the pretension force toward the at least one nozzle plate by at least one biasing element, in particular an elastic element, preferably a spring. With the at least one biasing element, the at least one impact surface can be held near the at least one nozzle plate in the initial position at least in an initial operating state.

Advantageously, the at least one biasing element can apply to the at least one impact surface, in particular the valve body. With another side, the at least one biasing element can rest on a housing of the oil mist separator.

Favorably, the at least one biasing element can comprise at least one elastic element. So, the at least one elastic element can reset the at least one impact surface to the initial position.

Particularly, the at least one biasing element can be realized by at least one spring, in particular a pressure spring and/or a tension spring. The at least one spring can comprise a coil spring, a compression spring, a helical spring, a spiral spring, a flat spring and/or another kind of spring.

Particularly, one, two or more biasing elements can be used.

According to a further favorable embodiment of the invention, the at least one impact surface can be structured at least partially. In this way, the efficiency of separation can be increased. With the structure, the area of the at least one impact surface can be increased.

The structure can be realized by at least one structuring element. Preferably, a multitude of structuring elements can be arranged along the impact surface. Particularly, at least two, preferably all, of the structuring elements can be identical. Particularly, a shape of at least one structuring element can be similar or different to the shape of at least one control protrusion.

Advantageously, at least one structuring element can have a shape similar to a pyramid, a cone, an obelisk, a wedge, a pin, a cylinder or a frustum of a pyramid/cone/obelisk/wedge or suchlike.

According to a further favorable embodiment of the invention, at least one aperture can be realized in such a way that it is not to be sealed by at least one impact surface and/or by at least one control protrusion in any regular operating condition. In this way, gaseous fluid always can flow through this at least one aperture. To this effect it is not a regular operating condition if at least one aperture is blocked by an external influence, in particular by icing-up. Favorably, said at least one aperture can be at least one nozzle aperture. So, the particles can be separated at the at least one impact surface by use of said at least one nozzle aperture.

According to a further favorable embodiment of the invention, at least one aperture can be realized in such a way that it can be sealed by at least one impact surface and/or by at least one control protrusion at least in an initial state. In this way, gaseous fluid cannot flow through this at least one aperture at least in an initial state. So, a flow rate of the gaseous fluid through the separator can be limited at least in an initial state. Under certain operating conditions, the at least one aperture can be opened for enabling an increased flow rate and/or for equalizing a pressure difference upstream of the at least one aperture and downstream of the at least one impact surface.

According to a further favorable embodiment of the invention, at least one aperture can realize a valve aperture and at least one control protrusion can realize a valve body of a valve. In this way, the oil mist separator based on an impactor easy can be combined with a valve function. Favorably, the oil mist separator with the valve can be realized in one housing. Favorably, parts of the impactor can be used for the valve function. The valve body can be realized by at least one control protrusion which is part of the at least one impact surface or vice versa. So, the impact surface can be connected to the valve body or vice versa. According to the invention, the function of oil mist separation and the function of a valve can be combined in one unit.

With the valve a second flow path, in particular a bypass, to at least one nozzle aperture can be realized in particular if a pressure difference upstream of the at least one aperture and downstream of the at least one impact surface exceeds an acceptable value. The opening characteristics, in particular an opening pressure, of the valve can be defined by at least one biasing element.

If the valve is closed, gaseous fluid only can flow through the at least one aperture, in particular the nozzle aperture, which is not to be sealed by at least one control protrusion and/or at least one impact surface. The at least one aperture which is not to be sealed thereby effects the separation of the oil mist at the impact surface. If the opening pressure is reached, the valve opens at least partially. Gaseous fluid can flow through the valve aperture. Thus, the valve realizes a second flow path for the gaseous fluid. In this way, a rising of a pressure loss in particular with high flow rates can be limited. Further, the valve can realize an emergency venting path in case the at least one other aperture is blocked in particular caused by icing-up.

If the valve is opened, synchronously a distance of the impact surface from the apertures increases. So, the rising of a pressure loss can be reduced further.

With help of the valve, the oil mist separator can be adapted to an engine characteristic of an internal combustion engine for optimizing the separating efficiency.

Advantageously, the second flow path through the valve can comprise means for separating oil mist. Thus, a separation efficiency further can be improved. In particular, the second flow path can comprise at least one deflection and/or at least one impact surface section.

Favorably, the valve aperture can be surrounded by a valve body seat.

According to a further favorable embodiment of the invention, at least one control protrusion can comprise or form at least one impact surface section. Thus, particles can be separated at the at least one control protrusion. So, an efficiency for separation can be improved.

At least one impact surface section can overlap the at least one valve aperture, in particular the at least one valve seat.

Advantageously, at least one means for guiding can be attached to the at least one control protrusion. The at least one means for guiding can guide the at least one control protrusion in the at least one aperture, in particular in the at least one valve aperture. At least one means for guiding can comprise at least one ridge, pin and/or collar.

At least one means for guiding can be arranged within the at least one impact surface section of the at least one control protrusion.

Additionally or alternatively, at least one means for guiding can be arranged outside of at least one control protrusion. In particular, at least one means for guiding can be arranged on side of the nozzle plate. The at least one means for guiding on side of the nozzle plate can interact with at least one compatible means for guiding on side of at least one impact surface. At least one means for guiding on side of the nozzle plate can be formed by at least one guiding ridge and/or at least one guiding pin or suchlike. At least one compatible means for guiding can be formed by the edge of the nozzle plate.

According to a further favorable embodiment of the invention, at least one control protrusion can be arranged in the center of at least one impact surface, in particular coaxial to a moving axis. So, a pressure by the gaseous fluid impacting on the at least one control protrusion can be applied to the at least one impact surface more uniform.

Advantageously, at least one impact surface can be symmetrically. The at least one control protrusion can be in the middle of the at least one impact surface. If so, at least one impact surface section of the at least one control protrusion can be arranged in the middle of the at least one impact surface.

Advantageously, at least one control protrusion can be coaxial to a moving axis. So, a risk that the parts get jammed when moving the at least one impact surface can be reduced.

Advantageously, at least one control protrusion can be opposite to at least one biasing element. A main biasing force of the at least one biasing element can be coaxial to the at least one control protrusion. So, forces can apply more evenly.

The use of at least one aperture controllable by at least one control protrusion combined with at least one nozzle aperture which is not to be sealed under regular operating conditions can enable three pressure zones in the oil mist separator. A first pressure zone can be upstream of the nozzle plate. A second pressure zone can be between the at least one nozzle aperture and the impact surface. A third pressure zone can be downstream of the valve plate. The pressures in the three pressure zones, in particular the relations of the pressures in the three pressure zones, the moving of the nozzle plate and the degree of opening of the at least one aperture controlled by the at least one control protrusion realize a regulation, in particular a control loop.

Further the object is achieved by that the device for crankcase ventilation comprises at least one inventive oil mist separator.

The above-mentioned advantages and characteristic features of the inventive oil mist separator apply analogously to the inventive device for crankcase ventilation and its favorable embodiments and vice versa.

BRIEF DESCRIPTION OF DRAWINGS

The present invention together with the above-mentioned and other objects and advantages may best be understood from the following detailed description of exemplary embodiments, but not restricted to the embodiments, wherein is shown schematically FIG. 1 a longitudinal section of an oil mist separator of a device for a crankcase ventilation of an internal combustion engine of a motor vehicle, according to a first embodiment, in an initial operating state with no or low blow-by gas flow;

FIGS. 4 to 9 isometric detailed views of nozzle plates and impact surfaces of alternative oil mist separators according to a second to sixth embodiment;

FIG. 10 a longitudinal section of an oil mist separator of a device for a crankcase ventilation according to a eighth embodiment in an initial operating state with no or low blow-by gas flow;

FIG. 11 the oil mist separator of FIG. 10 in an operating state with medium blow-by gas flow;

Figure 1:
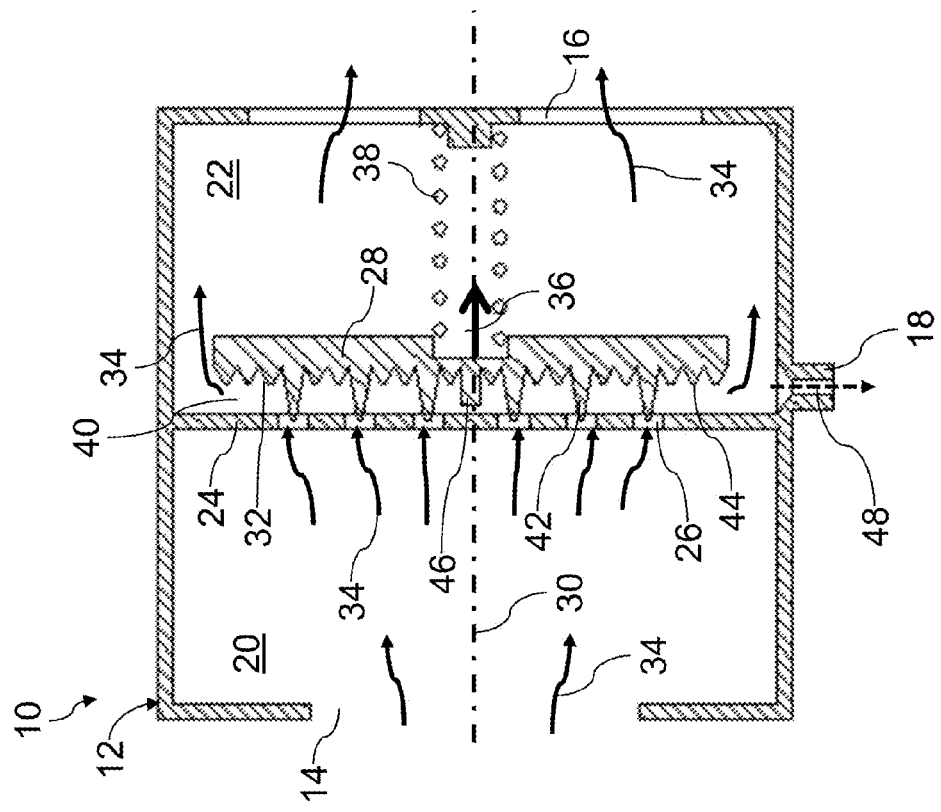

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 2:
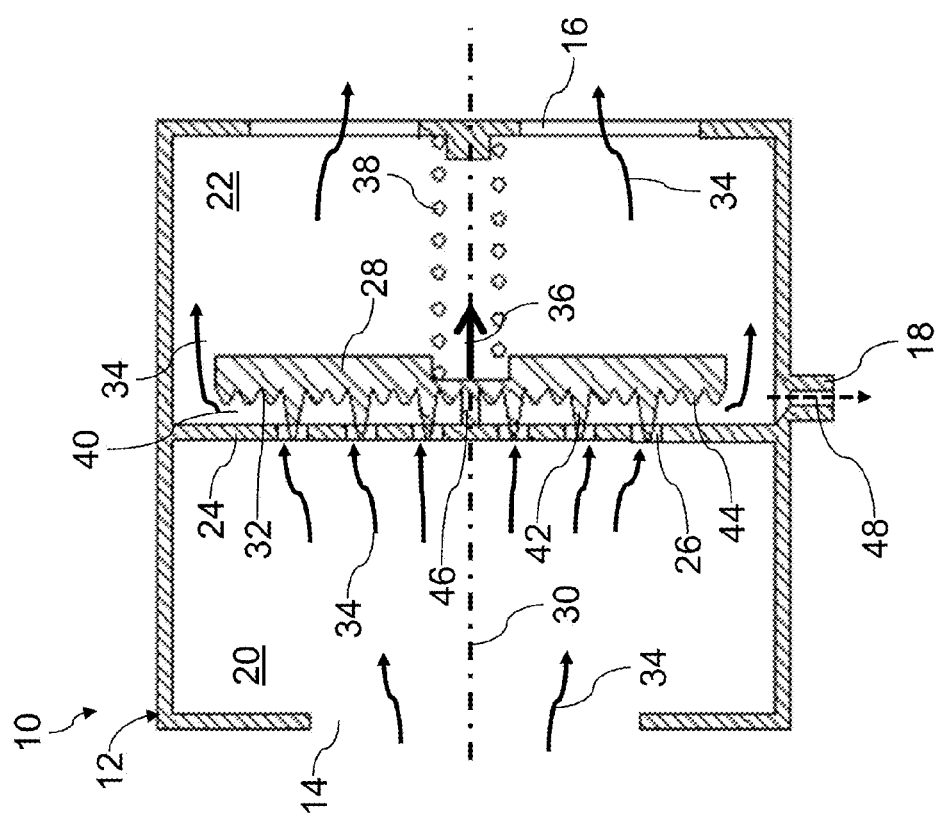
FIG. 2 the oil mist separator of FIG. 1 in an operating state with medium blow-by gas flow.
Figure 3:
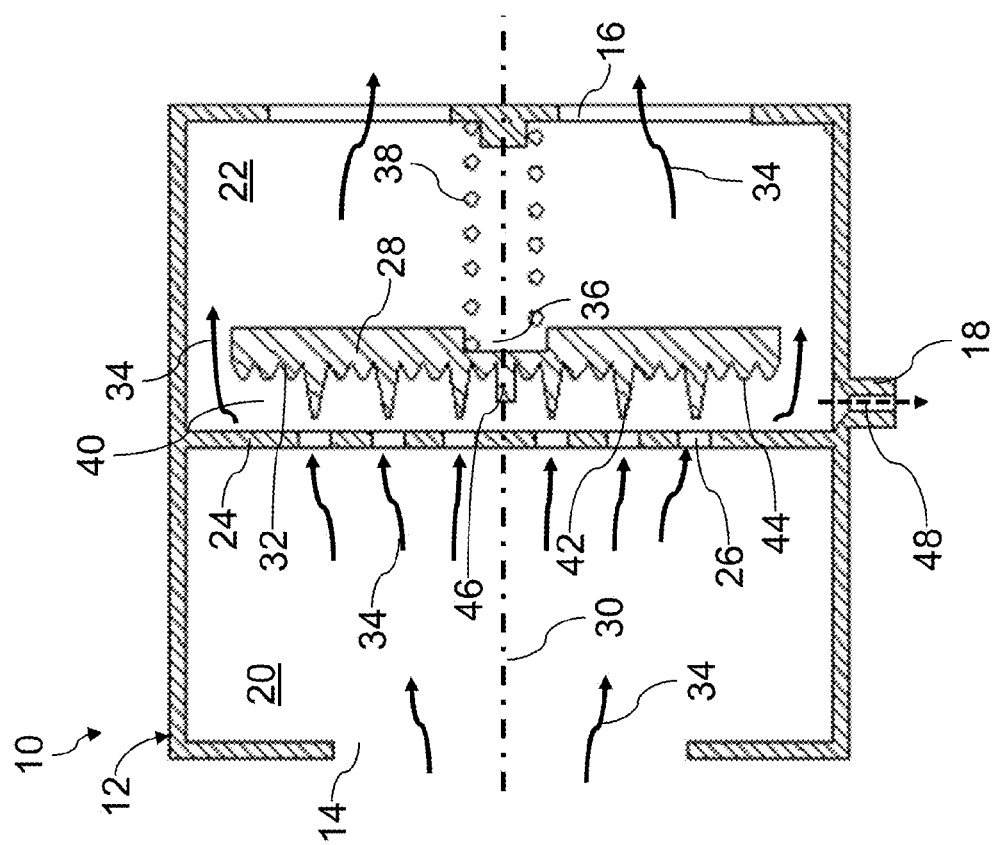
FIG. 3 the oil mist separator of FIGS. 1 and 2 in an operating state with high blow-by gas flow.
Figure 12:
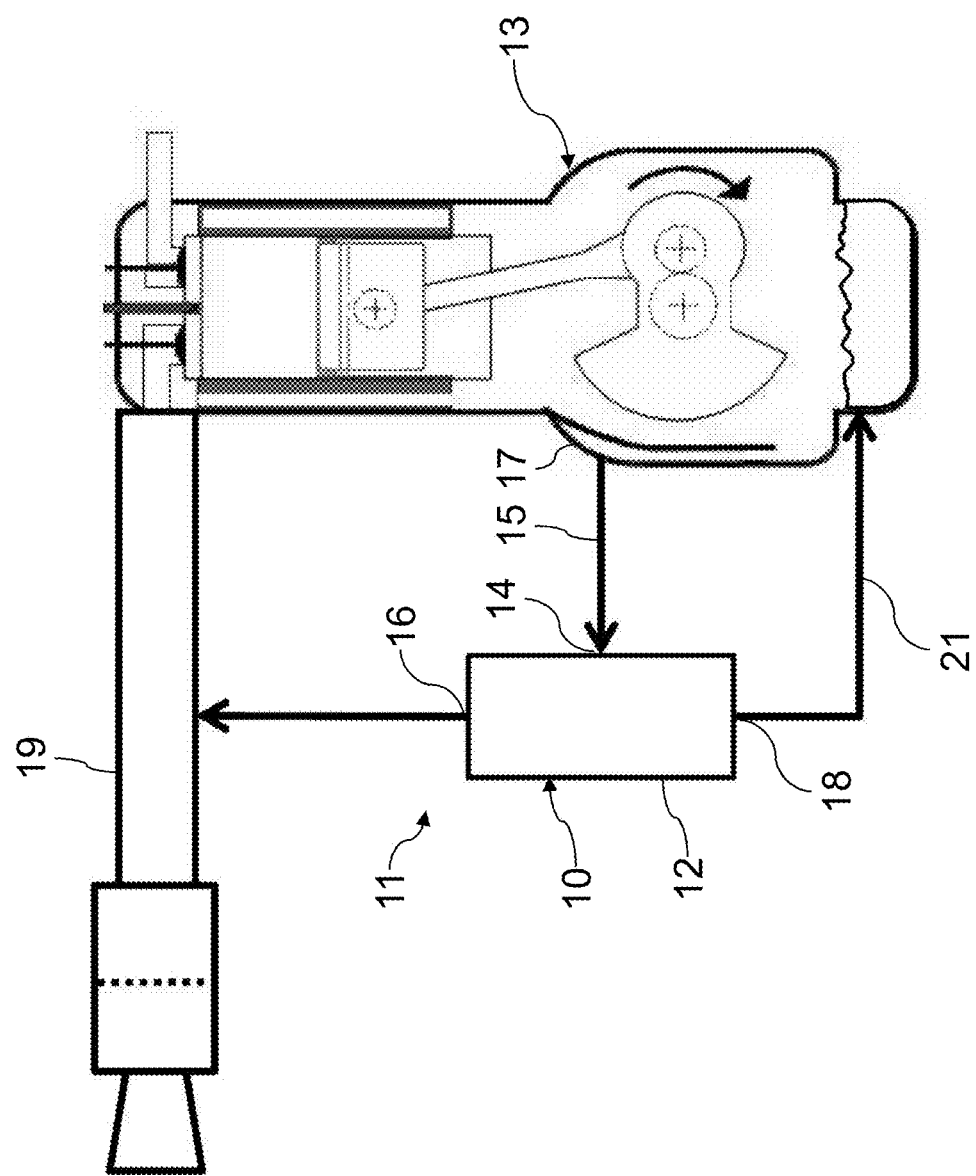
FIG. 12 an internal combustion engine with a crankcase ventilation comprising an oil mist separator as in FIGS. 1 to 11.

FIGS. 1 to 3 depict a first exemplary embodiment of an oil mist separator 10 of a device for crankcase ventilation 11 of an internal combustion engine 13 of a motor vehicle. A schematic view of an internal combustion engine 13 with the device for crankcase ventilation 11 is shown in FIG. 12. The oil mist separator 10 is arranged in a line 15 for crankcase ventilation leading from the crankcase 17 to an engine air intake 19 of the internal combustion engine 13. The oil mist separator 10 is destined for separating oil particles from a blow-by gas.

The oil mist separator 10 comprises a housing 12 with an inlet 14 for the blow-by gas, an outlet 16 for the cleaned blow-by gas and a drain 18 for the separated oil. The inlet 14 is connected to a line section coming from the crankcase. The outlet 16 is connected to a line section leading to the engine air intake 19. The drain 18 is connected to an oil line 21 leading continuously or discontinuously to an oil pan of the internal combustion engine 13.

The housing 12 is divided in an inlet chamber 20 and a separating chamber 22 by use of a nozzle plate 24. The inlet 14 opens out into the inlet chamber 20. The outlet 16 leads out of the separating chamber 22. The drain 18 leads through a bottom of the separating chamber 22. The drain 18 is arranged downstream the nozzle plate 24.

The nozzle plate 24 is arranged in a flow way of the blow-by gas between the inlet 14 and the outlet 16. The nozzle plate 24 has a multitude of exemplary identical nozzle apertures 26 for the blow-by gas. The nozzle apertures 26 can be uniformly arranged. They have a circular cross-section each.

A valve plate 28 is arranged in the separating chamber 22. The valve plate 28 is parallel to the nozzle plate 24. It is movable axial to a separator axis 30 relative to the nozzle plate 24. The separate axis 30 is identical with a moving axis of the most plates 28. The separator axis 30 is perpendicular to the nozzle plate 24 and the valve plate 28. The valve plate 28 has an impact surface 32 on the side which is facing the nozzle plate 24. The impact surface 32 lies downstream of the nozzle plate 24 relating to the flow of the blow-by gas. The flow of the blow-by gas through the oil mist separator is indicated by arrows 34. The valve plate 28 with the impact surface 32 can be moved away from the nozzle plate 24 in an opening direction 36 against a pretension force of a biasing element 38 by influence and dependent on the flow of the blow-by gas through the nozzle apertures 26.

A space between the nozzle plate 24 and the valve plate 28 serves as a flow path 40 for the blow-by gas. A passage for the blow-by gas is realized between the radial outer circumferential side of the valve plate 28 and the neighboring walls of the separating chamber 22.

A multitude of exemplarily identical control protrusions 42 for controlling the flow crosssection of the nozzle apertures 26 are attached to the impact surface 32 each. The control protrusions 42 are in one piece with the impact surface 32. Each of the nozzle apertures 26 correlates with one of the control protrusions 42. The control protrusions 42 have the form of a cone with a circular cross-section each. The axes of the cones are parallel to the separator axis 30. The apices face to the nozzle plate 24.

The impact surface 32 is structured. The structure is realized by a multitude of identical structuring elements 44. The structuring elements 44 are arranged uniformly along the impact surface 32. The structuring elements 44 have the form of cones each. The axes of the cones are parallel to the separator axis 30. The apices of the cones face to the nozzle plate 24. The length of the structuring elements 44 axial to the separator axis 30 is less than the length of the control protrusions 42.

The impact surface 32 is biased by the biasing element 38 toward the nozzle plate 24. The biasing element 38 has the form of a helical compression spring. With the biasing element 38, the impact surface 32 being held near the nozzle plate 24 in the initial operating state, as shown in FIG. 1. The biasing element 38 is coaxial to the separator axis 30. It applies on the side of the valve plate 28 which is facing away from the nozzle plate 24. With its other end, the biasing element 38 rests on the wall of the housing 12.

The valve plate 28 furthermore has a distance element 46, which is attached in one piece to the valve plate 28. The distance element 46 is arranged in the center of the impact surface 32. The distance element 46 is coaxial to the separator axis 30. It extends toward the nozzle plate 24. The length of the distance element 46 axial to the separator axis 30 when viewed from the impact surface 32 is between the length of the structuring elements 44 and the length of the control protrusions 42.

The initial operating state of the oil mist separator 10, as shown in FIG. 1, is realized during standard working conditions of the internal combustion engine 13. In standard working conditions the flow rate of the blow-by gas normally is relative low.

In the initial operating state the pretension force of the biasing element 38 holds the valve plate 28 in the initial position. The distance element 46 thereby rests against the nozzle plate 24 and realizes a limited stop for the valve plate 28. A distance between the impact surface 32, in particular the tops of the structuring elements 44, and the nozzle plate 24 has its minimum.

In the initial operating state the control protrusions 42 extend partly into the nozzle apertures 26 each. The nozzle apertures 26 are closed partially by the control protrusions 42. Circular gaps being realized between the radial outer circumferential side of the control protrusions 42 and the radial inner circumferential sides of the nozzle apertures 26 each. These gaps define the flow cross-sections of the nozzle apertures 26 each. The gaps are equal in circumferential direction. The blow-by gas can flow homogeneous through the gaps of the nozzle apertures 26.

In the initial operation state, the diameters of the sections of the control protrusions 42 located in the area of the downstream edge of the nozzle apertures 26 are of their maximum value. The gaps have their minimum size. The nominal gas flow through the nozzle apertures 26 each is reduced.

The blow-by gas is leaving the nozzle apertures 26 and is streaming against the impact surface 32. The oil particles being separated from the blow-by gas by means of the impact surface 32 and the structuring elements 44. The separated oil is sinking downward and is leaving the oil mist separator 10 through the drain 18, as indicated with an dashed arrow 48. The cleaned blow-by gas is leaving the oil mist separator 10 through the outlet 16.

With an increasing flow rate, the stream of the blow-by gas causes an opening force which is directed against the pretension force of the biasing element 38. As soon as the opening force exceeds the pretension force, the impact surface 32 is moved axial to the separator axis 30. The pretension force of the biasing element 38 is predetermined for allowing a movement of the impact surface 32 as soon as a pressure difference between upstream and downstream of the impact surface 32 exceeds a defined value. The pretension force therefore is predetermined at a total flow of blow-by gas which corresponds to the defined differential pressure.

The impact surface 32 is moved continuously dependent on the blow-by gas flow through the nozzle apertures 26. The higher the blow-by gas flow is, the more the impact surface 32 will be deflected from the initial position into a position farther away from the nozzle plate 24. By moving the impact surface 32 away from the nozzle plate 24 a flow cross-section of the flow path 40 between the nozzle plate 24 and the impact surface 32 is increased. As a result a loss of pressure will be limited.

The control protrusions 42 being moved automatically together with the impact surface 32 relative to the nozzle apertures 26. The control protrusions 42 still being kept inside the nozzle apertures 26 within a range of moving of the impact surface 32.

In a further exemplary operating state with medium gas flow, as shown in FIG. 2, the control protrusions 42 cover the nozzle apertures 26 with sections which have smaller cross-sections compared to the sections which covered the nozzle apertures 26 in the initial operating state. The diameter of the control protrusions 42 in the area of the downstream edges of the nozzle apertures 26 is smaller than the diameter of the nozzle apertures 26. The gaps between the radial outer circumferential side of the control protrusions 42 and the radial inner circumferential side of the nozzle apertures 26 increase with the movement of the control protrusions 42. Accordingly, the flow cross-sections increase. As a result, the flow velocity through the nozzle apertures 26 being reduced. A continuous opening characteristic for the nozzle apertures 26 being achieved by moving the conical control protrusions 42.

In FIG. 3 a third exemplary operating state with even stronger blow-by gas flow is shown. In the third operating state the impact surface 32 has its maximum distance to the nozzle plate 24. The maximum distance between the impact surface 32 from the nozzle plate 24 is greater than the length of the control protrusions 42 axial to the separator axis 30. In the third operating state, the control protrusions 42 being pulled completely out of the nozzle apertures 26. The maximum flow cross-section of the nozzle apertures 26 being achieved.

By automatically moving the impact surface 32 and the control protrusions 42 back and forth during operation, the flow velocity through the nozzle apertures 26 being maintained to a defined level. The flow velocity and the pressure loss being kept steady and more or less independent from the total gas flow rate of the blow-by gas. With the described exemplary embodiment, a flow velocity of the blow-by gas through the nozzle apertures 26 is kept steady with a large range of total flow rates.

FIGS. 4 to 9 depict details of alternative exemplary embodiments of oil mist separators 10 each.

With the second embodiment, shown in FIG. 4, the control protrusions 42 have the form of a cone with a circular cross-section each. The axes of the cones are parallel to the separator axis 30. The apices face to the nozzle plate 24.

Different to the first embodiment, with the third embodiment, which is shown in FIG. 5, the control protrusions 42 and the structuring elements 44 are frustums of cones with circular cross-sections each.

Different to the first embodiment, with the fourth embodiment, which is shown in FIG. 6, the control protrusions 42 and the structuring elements 44 are pyramids with quadratic cross-sections each. The shapes of the cross-sections of the nozzle apertures 26 are different to the shapes of the cross-sections of the radial outer circumferential sides of the control protrusions 42 each.

Different to the first embodiment, with the fifth embodiment shown in FIG. 7, the control protrusions 42 and the structuring elements 44 are frustums of pyramids with quadratic cross-sections each. The shapes of the cross-sections of the nozzle apertures 26 are different to the shapes of the cross-sections of the radial outer circumferential sides of the control protrusions 42 each.

Different to the first embodiment, with the sixth embodiment shown in FIG. 8, the structuring elements 44 are pyramids each. The control protrusions 42 have a wedge profile with rectangular cross-sections each. The nozzle apertures 26 are slotted holes. Two of the edges of the slotted holes, which are on opposed sides, are curved. The nozzle apertures 26 have a somehow oval cross-section each. The shapes of the cross-sections of the nozzle apertures 26 are different to the shapes of the cross-sections of the radial outer circumferential sides of the control protrusions 42 each.

Different to the first embodiment, with the seventh embodiment shown in FIG. 9, the structuring elements 44 are frustums of cones each. The control protrusions 42 have a wedge profile with flattened top each. Two of the side-walls, which are on opposed sides, are curved. The control protrusions 42 have a somehow oval cross-section each. The nozzle apertures 26 are slotted holes. Two of the edges of the slotted holes, which are on opposed sides, are curved. The nozzle apertures 26 have a somehow oval cross-section each.

FIGS. 10 and 11 depict a eighth embodiment of the oil mist separator 10. Those parts which are equal to those of the first embodiment according to FIGS. 1 to 3 have the same reference numbers. Different to the first embodiment, with the eighth embodiment the valve plate 28 has only one control protrusion 142.

The control protrusion 142 is realized as a convexity in the centre of the valve plate 28. The control protrusion 142 is formed as a valve body. The control protrusion 142 is acting together with an aperture which is formed as a valve aperture 126. The control protrusion 142 and the valve aperture 126 are coaxial to the separator axis 30. The control protrusion 142 and the valve aperture 126 act together as a valve 150. An edge surrounding the valve aperture 126 facing the control protrusion 142 is acting as a valve seat 152.

The nozzle apertures 26 have no related control protrusion.

The control protrusion 142 has an impact surface section 132 facing toward the valve aperture 126. Within the impact surface section 132 two guiding ridges 154 are attached to the control protrusion 142. The guiding ridges 154 are arranged symmetrically on opposed sides of the separator axis 30. The guiding ridges 154 are directed to the valve aperture 126.

A diameter of the impact surface section 132 is bigger than the diameter of the valve aperture 126. A diameter of a circumference through the radial outer circumferential sides of the guiding riches 150 is smaller than the diameter of the valve aperture 126. The diameter of the valve aperture 126 is bigger than the diameter of the nozzle apertures 26.

On the rear side of the control protrusion 142 opposite to the impact surface section 132 a guiding pin 156 is attached to the valve plates 28. The guiding pin 156 is coaxial to the separator axis 30. The guiding pin 156 is guided in a coaxial pilot hole 158 of a step of the housing 12. The biasing element 38 is located in the pilot hole 158 and surrounds the guiding pin 156. The biasing element 38 applies on the rear side of the valve plate 28. With its other end the biasing element 38 rests on a step of the housing 12.

In the initial regular operating state of the oil mist separator 10, shown in FIG. 10, the impact surface section 132 rests on the valve seat 115 and covers the valve aperture 126. The valve aperture 126 is sealed by the impact surface section 132. The guiding ridges 154 are guided in the valve aperture 126.

In the initial operating state the control protrusion 142 further acts as a distance element for keeping the flow path 40. The nozzle apertures 26 are not to be sealed by the impact surface 32 in any regular operating condition.

The blow-by gas can flow through the nozzle apertures 26 against the structuring elements 44. The oil particles being separated from the blow-by gas by means of the impact surface 32 and the structuring elements 44. The separated oil is sinking downward and is leaving the oil mist separator 10 through the drain 18, as indicated with the dashed arrow 48. The cleaned blow-by gas is leaving the oil mist separator 10 through the outlet 16.

In an further regular operational state in which the pressure difference between the upstream side and the downstream side of the oil mist separator 10 increases, the opening force on the upstream side presses against the impact surface section 132 of the control protrusion 142. The valve 150 opens continuously dependent on the pressure difference and realizes a second flow path 140 for the blow-by gas. Blow-by gas flows through the valve aperture 126. In the second flow path 140 through the valve 150 the oil particles being separated with help of the impact surface section 132 and multiple deflections.

Synchronously, a distance of the impact surface 32 from the nozzle apertures 26 increases. Blow-by gas continuously flows through the nozzle apertures 26 and the oil will be separated as described above in the initial operation state. The rising of a pressure loss will be reduced further.

The use of the valve aperture 126 controllable by the control protrusion 142 combined with the nozzle apertures 26 enables three pressure zones 160, 162 and 164 in the oil mist separator 10. A first pressure zone 160 is upstream of the nozzle plate 24. A second pressure zone 162 is between the nozzle apertures 26 and the impact surface 32. A third pressure zone 164 is downstream of the valve plate 28. The relations of the pressures in the different pressure zones 160, 162 and 164, the moving the nozzle plate 24 and the degree of opening of the valve aperture 126 realize a regulation.

The second flow path 140 also can act as a kind of bypass to the nozzle apertures 26 if a pressure difference upstream of the valve aperture 126 and the nozzle apertures 26 and downstream of the impact surface 32 exceeds an acceptable value, for example in an irregular operational state. For example the valve 150 can open if the nozzle apertures 26 are blocked exemplary caused by icing-up.

What is claimed is:

1. An oil mist separator of a device for crankcase ventilation of an internal combustion engine for separating oil particles from a gaseous fluid such as blow-by gas, the oil mist separator comprising:
    a nozzle plate arranged in a flow path of the gaseous fluid, the nozzle plate having a plurality of nozzle apertures extending through the nozzle plate, the nozzle apertures for the gaseous fluid to pass through the nozzle plate;
    a valve plate arranged at a downstream side of the nozzle plate, the valve plate configured to be movable in an opening direction relative to the nozzle plate to have a variable distance away from the nozzle plate, the valve plate having:
        at least one impact surface facing of the valve plate facing the nozzle plate, the at least one impact surface moving with the valve plate;
        a plurality of tapered control protrusions formed on the impact surface and each projecting towards a respective nozzle aperture; and
        tapering structuring projections arranged on the impact surface between adjacent ones of the tapered control protrusions, the tapering structuring projections having a length in the opening direction that is less than an opening direction length of the plurality of tapered control protrusions, the tapering structuring projections having a base arranged directly on the impact surface, and have a cross-section that continuously tapers from the base to an apex end;
    wherein the plurality of tapered control protrusions have a base arranged directly on the impact surface, and have a cross-section that continuously tapers from the base to an apex end of the plurality of tapered control protrusions;
    wherein the plurality of nozzle apertures each align in the opening direction to be receive the apex end of a respective one of the plurality of tapered control protrusions;
    wherein the impact surface with the plurality of tapered control protrusions are moved in the opening direction by a flow induced force acting against a pretension force of a pretension element, the movement dependent on a flow rate of the gaseous fluid through plurality of nozzle apertures, an amount of flow induced movement of the plurality of tapered control protrusions in the a plurality of nozzle apertures varying a flow cross-section of the plurality of nozzle apertures;
    wherein flow of the gaseous fluid through the varying flow cross-section of the plurality of nozzle apertures impacts against the tapering structuring projections, removing oil mist from the gaseous fluid.

2. The oil mist separator according to claim 1, wherein the at least one impact surface is biased with the pretension force toward the nozzle plate by at least one elastic biasing spring element.

3. A device for a crankcase ventilation of an internal combustion engine, comprising
    at least one oil mist separator for separating oil particles from a gaseous fluid according to claim 1.

4. The oil mist separator according to claim 1, wherein the plurality of nozzle apertures and/or a radial outer circumferential surface of the plurality of conical control protrusions have a cross section that is: circular, an elliptical, an oval, an angular.

5. The oil mist separator according to claim 4, wherein a shape of the cross-section of the plurality of nozzle apertures is substantially the same as a shape of a cross-section of the radial outer circumferential surface of the plurality of conical control protrusions.

6. The oil mist separator according to claim 4, wherein a shape of the cross-section of the plurality of nozzle apertures is dissimilar to a shape of the cross-section of the radial outer circumferential surface of at least one corresponding one of the plurality of conical control protrusions.

7. The oil mist separator according to claim 1, wherein the plurality of conical control protrusions extend at least partly into and/or onto and/or covers over the plurality of nozzle apertures at least in an initial state of the oil mist separator.

8. The oil mist separator according to claim 7, wherein the plurality of conical control protrusions have a variable radial outer circumferential surface which when viewed axial to a moving axis, a circumference length of the at least one control protrusion decreases toward its apex end, which is facing the nozzle plate.

9. The oil mist separator according to claim 8, wherein the plurality of tapered control protrusions on the at least one impact surface are arranged coaxial to the moving axis.

10. The oil mist separator according to claim 7, wherein the plurality of conical control protrusions is one of: a pyramidal shape, a cone, a wedge, or a frustum of a pyramid/cone/wedge.

11. The oil mist separator according to claim 7, wherein the plurality of nozzle apertures are configured such that the plurality of nozzle apertures are not to be sealed against flow by the at least one impact surface and/or by the plurality of tapered control protrusions during any regular operating condition of the oil mist separator.

12. The oil mist separator according to claim 7, wherein the plurality of nozzle apertures and at least one impact surface are configured such that the plurality of nozzle apertures are sealed by the at least one impact surface and/or by the plurality of tapered control protrusions.

13. The oil mist separator according to claim 7, wherein the plurality of nozzle apertures are configured as valve apertures and the plurality of tapered control protrusions are configured as a valve body of a valve received into and closable against the plurality of nozzle apertures.

14. The oil mist separator according to claim 7, wherein the plurality of tapered control protrusions have a section forming at least one impact surface section.

\* \* \* \* \*